United States Patent [19]
Abdullah

[11] Patent Number: 5,953,714
[45] Date of Patent: Sep. 14, 1999

[54] DATA BASE SEARCHING SYSTEM

[76] Inventor: Ayad Abdulgabar Abdullah, 197 Llantarnam Road, Cwnbrab, Gwent, United Kingdom, NP44 3BG

[21] Appl. No.: 08/722,137
[22] PCT Filed: Apr. 6, 1995
[86] PCT No.: PCT/GB95/00803
§ 371 Date: Oct. 4, 1996
§ 102(e) Date: Oct. 4, 1996
[87] PCT Pub. No.: WO95/27947
PCT Pub. Date: Oct. 19, 1995

[30] Foreign Application Priority Data

Apr. 6, 1994 [GB] United Kingdom .................... 9406747

[51] Int. Cl.$^6$ ...................................................... G06F 17/30
[52] U.S. Cl. ................................................................ 707/3
[58] Field of Search ................................ 365/49, 189.07, 365/189.08; 707/3, 1; 712/224

[56] References Cited

U.S. PATENT DOCUMENTS

| | | | |
|---|---|---|---|
| 3,984,821 | 10/1976 | Locke | 340/173 |
| 4,823,313 | 4/1989 | Kadota | 365/49 |
| 4,935,719 | 6/1990 | McClure | 340/146.2 |
| 4,958,104 | 9/1990 | Yasunda et al. | 340/146.2 |
| 5,444,649 | 8/1995 | Nemirovsky | 365/49 |

FOREIGN PATENT DOCUMENTS 0 554 177 A1  8/1993  European Pat. Off. .

OTHER PUBLICATIONS

*Parallel Search of Shift Registers*, H.H. Ruzicka, IBM Technical Disclosure Bulletin, vol. 17, No. 3, Aug. 1974, pp. 807–808.

*Content–Addressable Memory Uses 256–Byte 'Superwords'*, Sydney M. Lamb, Mini–Micro Systems, Oct. 1983, pp. 237–242.

Wallis, L. "Associative memory calls on the talents of systolic array chip", Electronic Design, pp. 217–226, Dec. 1984.

*Primary Examiner*—Jack M. Choules
*Attorney, Agent, or Firm*—David P. Gordon; David S. Jacobson; Thomas A. Gallagher

[57] ABSTRACT

A data base searching system comprises a memory (M) having a plurality of locations for data items (L), a plurality of passive logic circuits (LC), and a control unit (C) for receiving a query data item and in response thereto producing a group of query signals which are aplied to all passive logic circuits (LC) in parallel. The passive logic circuits (LC) simultaneously compare the query data item (as represented by the group of query signals) with the data items held at the respective locations (L), each passive logic circuit (LC) providing an output to indicate if its associated data item passes a selected comparative test relative to the query data item (e.g. equality, inequality, greater than, less than, etc.).

22 Claims, 4 Drawing Sheets

DATA BASE SEARCHING SYSTEM

BACKGROUND OF THE INVENTION

1. Field of the Invention

This invention relates to a data base searching system and more particularly to a system which enables a data base to be interrogated at very high speed.

2. State of the Art

It has been proposed for data base searching systems to include a plurality of processing elements which simultaneously compare respective data records with a common data item being searched for. The processing elements of such systems include microprocessors and are therefore complex. Furthermore, communications sub-systems are required between the various processing elements, and an interrogations sub-system is required in order to interrogate the processing elements so that the results of the search procedure can be established.

Another system which has been proposed, called Content Addressable Memory, includes a comparator for each bit in the memory: this system can only provide equality comparisons and has fixed field and record sizes and more importantly is very expensive to produce because CAM memory cells are an order of magnitude larger than dynamic RAM.

SUMMARY OF THE INVENTION

In accordance with this invention there is provided a data base searching system which comprises a memory having a plurality of locations for respective items of data, a plurality of passive logic circuits, data lines connecting the memory to respective said passive logic circuits, and a control unit for receiving a query data item and in response thereto producing a group of query signals which are applied simultaneously to all the passive logic circuits in parallel to cause all the passive logic circuits simultaneously and independently of each other to compare the query data item, as represented by the group of query signals, with the data items held in the respective memory locations, each passive logic circuit providing an output indicating if its associated data item has passed a comparative test relative to the query data item.

This system is of relatively simple construction because the comparative tests are carried out in passive logic circuits rather than in microprocessor-based processing elements, and there is no requirement for communication or interrogations sub-systems.

In an embodiment to be described herein, the comparison function is carried out bit-by-bit as the stored data items are passed in serial manner to their respective passive logic circuits and the group of query signals change with changes in the successive bits of the query data item.

The comparison function may take any of several forms, e.g. equality, inequality, greater than, less than, greater than or equal to, less than or equal to.

The outputs from all of the passive logic circuits may be connected to an OR gate, the output of which therefore indicates if one or more of the stored data items, or records, has passed the comparative test being made.

The outputs from the passive logic circuits may be connected to a tally circuit which sums the passive logic circuits which have indicated passing the test.

Preferably a circuit is provided which enables any records which have passed the comparative test to be read out, one at a time, onto a common read-out line. The circuit identifies the first passive logic circuit in a chain which indicates a PASS, and gives that circuit a cursor which allows the associated record to be read out, whilst any others which have PASSED are prevented. Once this record has been read out, the cursor can be moved on to the next logic circuit in the chain which indicates a PASS.

Also in accordance with this invention there is provided a passive logic circuit for use in a data base searching system, the logic circuit having an input for receiving a data item, and inputs for receiving a group of query signals representing a query item of data against which the input data item is to be compared and also defining the type of comparison test to be employed, said logic circuit being arranged for carrying out the comparison test and providing an output signal indicating the result of the comparison test.

Preferably the output signal is a simple logic level i.e. single digital bit. Preferably the logic circuit comprises a latch which is set if the comparative test is passed. Preferably the logic circuit comprises another latch which is set if the comparative test is failed at any bit position during the comparison.

The group of query signals may change not only according to the nature of the test being made and whether the current bit of the query data item is a 1 or a 0, but also according to the bit-position: in particular the final bit may require a different group of signals to the preceding bits.

Preferably however, the outputs from the plurality of passive logic circuits are connected to an aggregate circuit which is able to carry out one or more set operations, for example to determine which is the record or records of minimum value, or to determine which is the record or records of maximum value. The circuit is preferably also used to indicate the minimum value, or the maximum value.

Further in accordance with this invention there is provided an aggregate circuit for carrying out an aggregate function in a data base searching system, the aggregate circuit comprising a plurality of data inputs for simultaneously receiving respective items of data in serial manner, a first output for providing a predetermined signal, in respect of each individual bit position, when the bits of all data items received on said inputs have a first value at that bit position, and a second output for providing a second predetermined signal, in respect of each individual bit position, when the bits of all data items received on said inputs have a second value at that bit position.

The above-defined aggregate circuit may be used to perform a number of different aggregate functions yet is of a simple construction.

Embodiments of this invention will now be described by way of examples only and with reference to the accompanying drawings.

DETAILED DESCRIPTION OF THE PREFERRED EMBODIMENT

Figure 1:
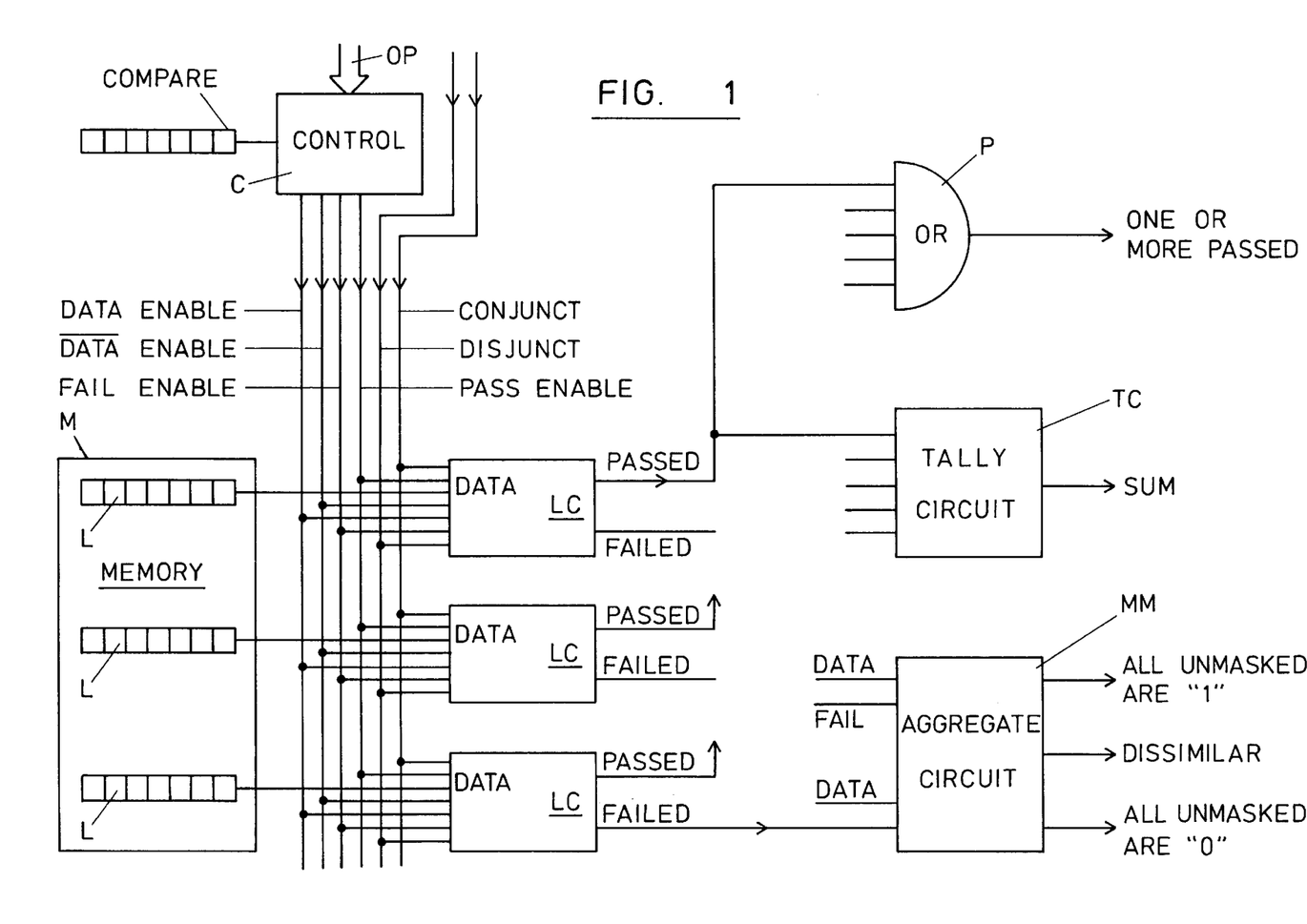
FIG. 1 is a schematic block diagram of a data base searching system in accordance with this invention.
Figure 2:
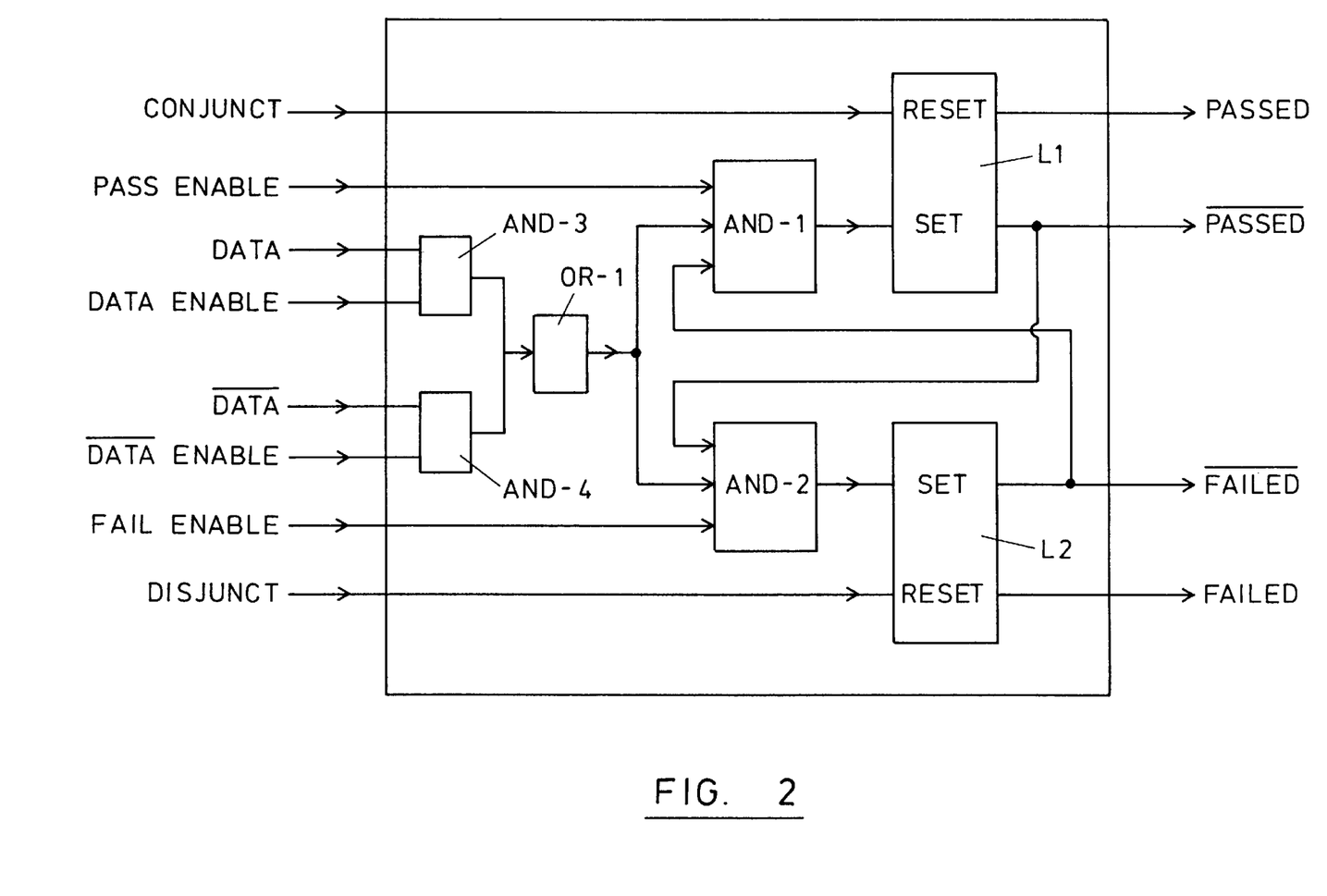
FIG. 2 is a block diagram of one of the passive logic circuits of the system shown in FIG. 1.

Referring to FIG. 1, a data base searching system in accordance with this invention comprises a memory M having a plurality of locations L for holding respective data items or records: each record comprises a plurality of bits typically divided into a number of fields. The system further comprises a plurality of passive logic circuits LC, one or more for each memory location L. One of the passive logic circuits LC is shown in FIG. 2 and will be described in detail below, but as shown in FIG. 1 each passive logic circuit LC has a DATA input for receiving the record from the respective memory location L in serial manner. The passive logic circuit LC further has four inputs connected to query lines PASS ENABLE, DATA ENABLE, $\overline{\text{DATA}}$ ENABLE and FAIL ENABLE respectively, two further inputs connected to respective lines CONJUNCT and DISJUNCT, and two result outputs PASSED and FAILED. The system further comprises a control element C having respective outputs connected to four query lines PASS ENABLE, DATA ENABLE, $\overline{\text{DATA}}$ ENABLE and FAIL ENABLE: these four query lines, together with the two lines CONJUNCT and DISJUNCT, are connected to all of the passive logic circuits LC in parallel. The control element C has a serial data input COMPARE for a data item with which the records in the locations L are to be compared, and an input OP for an operations code which determines the nature of the operation to be made e.g. a test for equality, inequality, greater than, less than, equal to or greater than, or equal to or less than, a minimum or maximum function, a read or write function, or an advance cursor function (each of which will be referred to later in this description).

In general, when a search is to be carried out, the nature of the comparison to be made (e.g. equality etc) is selected by means of the operations code applied to the input OP of the control element C. The data item being searched for is fed in serial manner to the COMPARE input of the control element C. The bit received at COMPARE and the code received at OP address a map or look-up table to supply signals (logic 1 or 0) on the four query lines, which depend upon the bit value received at COMPARE and the nature of the comparison test to be made: thus as the value of successive bits received at COMPARE changes, the logic signals on the four query lines change.

The passive logic circuits LC operate simultaneously but independently of each other, to compare the records contained in their respective memory locations L with the data item being searched: the nature of the comparison is as determined by the code applied to the input OP of the control element C (i.e. equality, inequality etc). The comparison is effected bit-by-bit as the data item being searched is fed in serial manner into the COMPARE input of control element C and simultaneously the individual records are fed in serial manner from their memory locations L and into the respective passive logic circuits LC.

Each passive logic circuit LC determines whether the record fed from its memory location L satisfies the selected comparison with the search data item. If the comparison is satisfied, the passive logic circuit LC issues a signal (logic 1) on its PASSED output; if the comparison is not satisfied, the passive logic circuit LC issues a signal (logic 1) on its FAILED output.

If the comparison to be made is an equality comparison, it does not matter in what order the bits are compared. But if the comparison is a magnitude comparison, then the comparison must be in order from the most significant to the least significant bit.

The search procedure may consist of each record L in its entirety being compared with the search data item, or one or more selected fields of each record, or one more parts of selected fields of each record.

Optionally, the PASSED outputs of the passive logic circuits LC may all be connected to an OR gate P, an output signal from which therefore indicates if one or more of the records has passed the comparison made in the search. The FAILED outputs of the passive logic circuits LC are all connected to an aggregate circuit MM which will be described in detail below: the DATA from the respective memory locations L are also connected to respective inputs of the aggregate circuit MM.

The system may optionally comprise a tally circuit TC to which the PASSED outputs of all the passive logic circuits LC are connected. This tally circuit TC gives an output of the number of records which have passed the comparison made in the search: this output may be a serial or parallel or combined serial/parallel output. The tally circuit TC can be used to produce a count of selected records. By counting the number of 1's in the selected records at each bit of a numeric field, then shifting that count and accumulating it, the sum of the numeric field across all the selected records can be calculated; e.g. the total invoice values for invoices over a particular period.

FIG. 2 shows one of the passive logic circuits LC in detail. The DATA input and a $\overline{\text{DATA}}$ input are connected to respective AND gates AND-3 and AND-4: the DATA ENABLE and $\overline{\text{DATA}}$ ENABLE query lines are connected respectively to the second inputs to these gates. The outputs of gates AND-3 and AND-4 are connected via an OR gate OR-1 to AND gates AND-1 and AND-2. The query lines PASS ENABLE and FAILED ENABLE are connected to gates AND-1 and AND-2 respectively. Gates AND-1 and AND-2 have third inputs which are connected to the $\overline{\text{FAILED}}$ and $\overline{\text{PASSED}}$ outputs respectively. The outputs of AND-1 and AND-2 are connected to the SET inputs of PASSED and FAILED latches L1 and L2 respectively, which provide the PASSED and FAILED outputs of the logic circuit. The CONJUNCT and DISJUNCT inputs to the logic circuit are connected to the RESET inputs of the latches L1 and L2.

It will be noted that the latches L1 and L2 are cross-connected to render them mutually exclusive, i.e. if one latch is set then the other latch cannot become set. Both latches are reset at the start of a new query, over lines CONJUNCT and DISJUNCT, so placing the circuit in an initial or "UNKNOWN" condition.

When a comparative test being run is an equality test, then at each bit the logic circuit will fail the record L from the memory if its bit value is different from that of the COMPARE item. Thus if the COMPARE bit value is 1, the FAIL ENABLE and $\overline{\text{DATA}}$ ENABLE query lines are asserted, so that the circuit will FAIL if the DATA bit is 0. If the COMPARE bit value is 0, the FAIL ENABLE and DATA ENABLE query lines are asserted, so that the circuit will FAIL if the DATA bit is 1. At the end of the field (i.e. immediately after the least significant bit has been tested), the PASS ENABLE, DATA ENABLE and $\overline{\text{DATA}}$ ENABLE query lines are asserted, so that the logic circuit will be set to the PASSED condition if it has not already been set to the FAILED.

Similarly for an inequality test, if the COMPARE bit is 1, PASS ENABLE and $\overline{\text{DATA}}$ ENABLE are asserted and the circuit PASSES if the DATA bit is 0. If the COMPARE bit is 0, PASS ENABLE and DATA ENABLE are asserted and the circuit PASSES if the DATA bit is 1. At the end of the field, FAIL ENABLE, DATA ENABLE and $\overline{\text{DATA}}$ ENABLE are asserted, so that the circuit now FAILS if not already PASSED.

For the comparative test "greater than", if the COMPARE bit is 0, PASS ENABLE and DATA ENABLE are asserted, so that the circuit PASSES if the DATA bit is 1. If the COMPARE bit is 1, FAIL ENABLE and $\overline{\text{DATA}}$ ENABLE are asserted, so that the circuit FAILS if the DATA bit is 0. At the end of the field, FAIL ENABLE, DATA ENABLE and $\overline{\text{DATA}}$ ENABLE are asserted, so that the circuit FAILS if not already PASSED.

For the comparative test "greater than or equal to", if the COMPARE bit is 0, PASS ENABLE and DATA ENABLE are asserted, so that the circuit PASSES if the DATA bit is 1. If the COMPARE bit is 1, FAIL ENABLE and $\overline{\text{DATA}}$ ENABLE are asserted, so that the circuit FAILS if the DATA bit is 0. At the end of the field, PASS ENABLE, DATA ENABLE and $\overline{\text{DATA}}$ ENABLE are asserted, so that the circuit PASSES if not already FAILED.

For the comparative test "less than", if the COMPARE bit is 0, FAIL ENABLE and DATA ENABLE are asserted, so that the circuit FAILS if the DATA bit is 1. If the COMPARE bit is 1, PASS ENABLE and $\overline{\text{DATA}}$ ENABLE are asserted, so that the circuit PASSES if the DATA bit is 0. At the end of the field, FAIL ENABLE, DATA ENABLE and $\overline{\text{DATA}}$ ENABLE are asserted, so that the circuit FAILS if not already PASSED.

For the comparative test "less than or equal to", if the COMPARE bit is 0, FAIL ENABLE and DATA ENABLE are asserted, so that the circuit FAILS if the DATA bit is 1. If the COMPARE bit is 1, PASS ENABLE and $\overline{\text{DATA}}$ ENABLE are asserted, so that the circuit PASSES if the DATA bit is 0. At the end of the field, PASS ENABLE, DATA ENABLE and $\overline{\text{DATA}}$ ENABLE are asserted, so that the circuit PASSES if not already FAILED.

The system may be required to test whether any record satisfies a comparison in one field and satisfies a comparison in another field. Or it may test whether any record satisfies a comparison in one field or a comparison in another field. In the first case, after a comparison has been made in the first field (or part of a field), the CONJUNCT line is activated to reset the latches L1 of those records which have passed (the latches L2 of those which have failed remaining set), before the required comparison is made in the other field (or part field). In the second case, after comparison has been made in the first field (or part field), the DISJUNCT line is activated to reset the latches L2 of those records which have failed (the latches L1 of those which passed on the first field remaining set).

Figure 3:
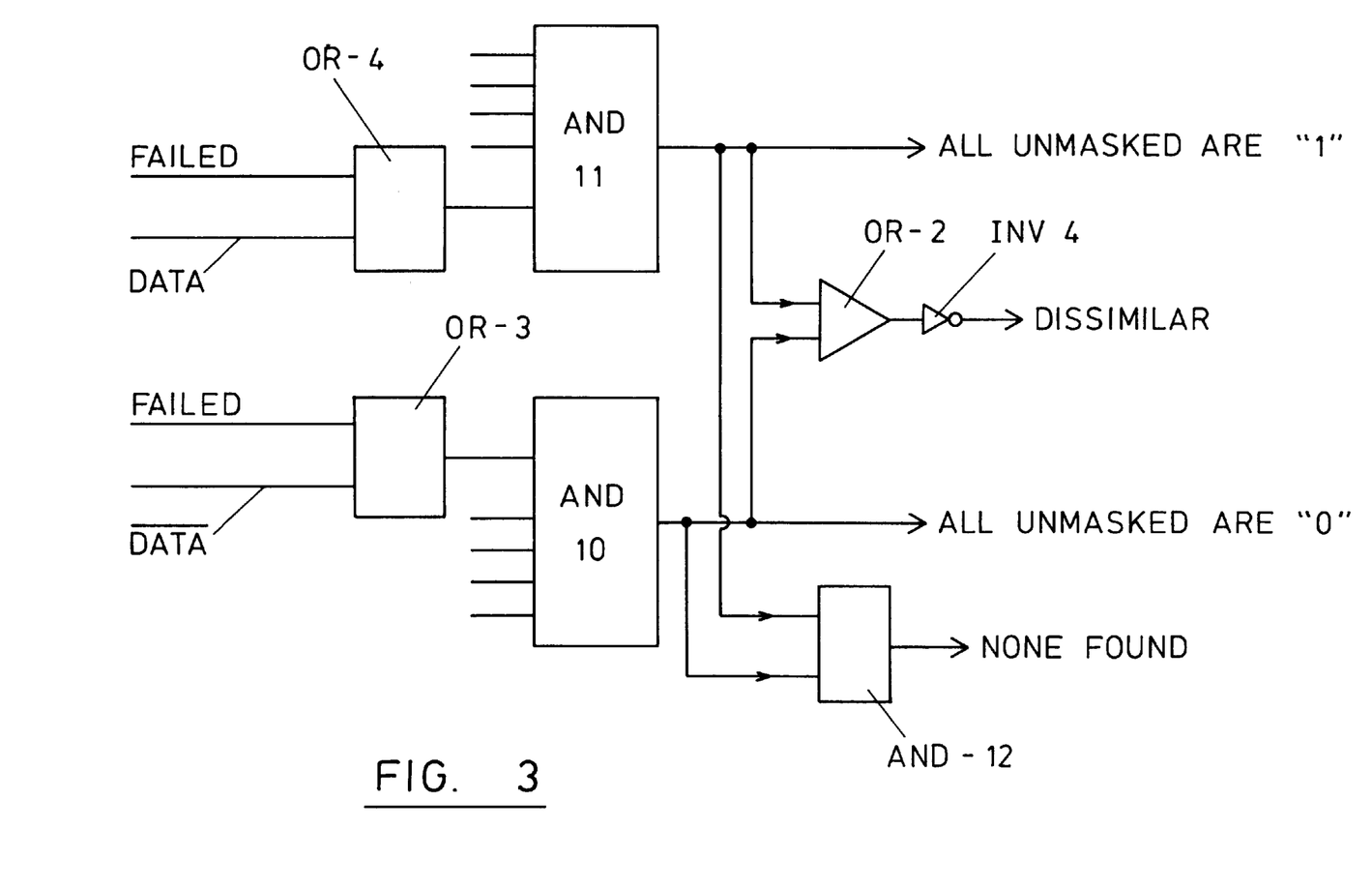
FIG. 3 is a block diagram of an aggregate circuit of the system.

FIG. 3 shows an aggregate circuit which may be used for carrying out a number of different aggregate functions, and may be used as the aggregate circuit MM of FIG. 1. The aggregate circuit is a passive logic circuit which comprises two AND gates AND-10 and AND-11 providing respective outputs the purpose of which will be described below. Also these outputs are connected to an OR gate OR-2 having an inverter INV-4 at its output. Each input to AND-11 is received from an OR gate OR-4, and each input to AND-10 is received from an OR gate OR-3. Each of the passive logic circuits LC of the system of FIG. 1 has its FAILED output connected to a respective gate OR-3 and to a respective gate OR-4: the DATA input to that logic circuit LC is also connected to OR-4 and the $\overline{\text{DATA}}$ input is connected to OR-3.

The aggregate circuit may be used to carry out a minimum or maximum search, in which it examines the bit positions of the respective records in sequence, masking out the records which fail at each bit position. Then if at a bit position being examined all unmasked records have a 1, a 1 output will be given by AND-11. If at the bit position being compared all unmasked records have a 0, a 1 output will be given by AND-10. If one or more of the unmasked records have a 1 and one or more have a 0 at the bit position being examined, then neither AND gate will give a 1 output and the DISSIMILAR output from INV-4 will be a 1.

Thus if it is desired to search for the record of maximum value, those with a 1 at the bit position being examined are to be kept and those with a 0 are to be failed: the signal on the DISSIMILAR line from INV-4 is included in the code applied to the OP input of control element C, and the mapping in control element C is such as to maintain a 1 on the $\overline{\text{DATA}}$ ENABLE query line: similarly FAIL ENABLE is asserted if a 1 appears on the DISSIMILAR output; the effect of this is to set the FAIL latch L2 of those logic circuits LC receiving a 0 on their DATA inputs (and therefore a 1 on their $\overline{\text{DATA}}$ inputs). In searching for the record or records with the minimum value, those with a 0 at the bit position being examined are to be kept and those with a 1 are to be failed: the control circuit C maintains a 1 on the DATA ENABLE query line; a 1 is placed on the FAIL ENABLE if a 1 appears on the DISSIMILAR output; the effect of this is to set the FAIL latch L2 of those processing elements receiving a 1 on their DATA inputs. After one bit position has been examined, the search moves on to examine the next bit position for those records which have not already failed, and so on. It will be appreciated that the code applied to the OP input of control element C includes the instruction to carry out a MINIMUM or MAXIMUM function.

The aggregate circuit of FIG. 3 also gives directly the minimum or maximum value, via its three outputs. For example when searching for a maximum, if at a given bit position gate AND-11 indicates that all unmasked records have a 1 at that position, or if the DISSIMILAR line indicates that one or more records have a 1 at that position, then clearly the maximum record has a 1 at that position; if instead gate AND-10 indicates that all records have a 0 at that position, then the maximum record must have a 0 at that position.

One important use of the aggregate circuit of FIG. 3 is to sort records into a required order, by means of successive minimum or maximum functions. Another important use is to group records sharing a common value in a particular field.

Also shown in FIG. 3 is an AND gate AND-12 receiving the outputs of the two gates AND-10 and AND-11. If all data records fail the comparison function being carried out, then AND-10 and AND-11 will give a 1 output, and AND-12 will also give a 1 output, indicating that no data records have passed the comparison (NONE FOUND). Equally, if a 0 appears on the output of AND-12, this indicates that one or more records have passed the comparison: this is preferably used instead of OR gate P of FIG. 1.

Figure 4:
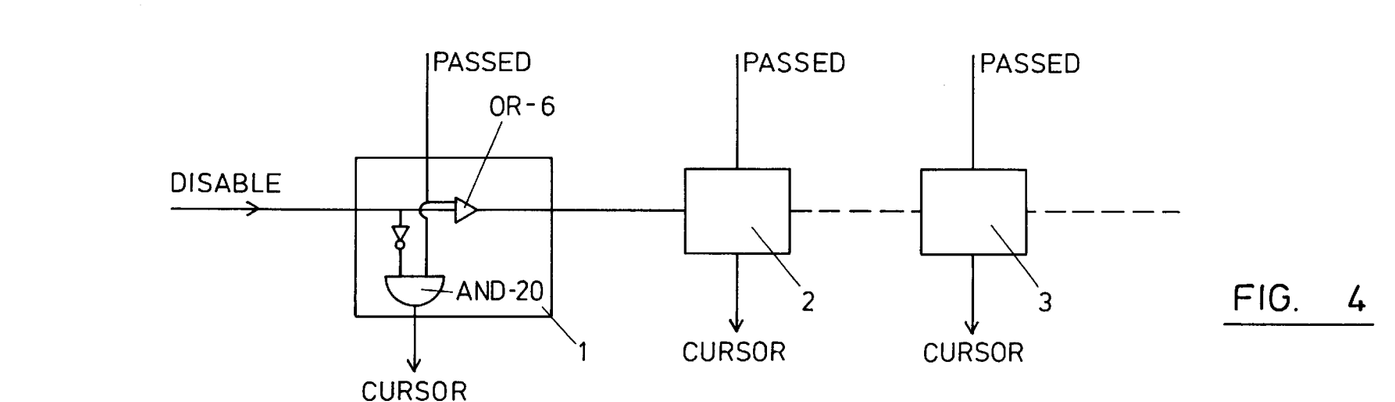
FIG. 4 is a block diagram of a cursor circuit chain of the system.

Referring to FIG. 4, the data base searching system further comprises a chain of cursor circuits C1, C2 . . . , one for each passive logic circuit LC. Each cursor circuit comprises an OR gate OR-6 having an input connected to the PASSED output of the respective passive logic circuits LC, and an input connected to the output of the OR gate of the previous cursor circuit in the chain (or in the case of the first cursor circuit C1, to a DISABLE input. Each cursor circuit further comprises an AND gate AND-20, having one input connected to receive the PASSED output and another input connected to the output of the previous cursor circuit (or to the DISABLE line) via an inverter INV-6.

In order to activate the cursor circuit chain, a 0 is placed on the DISABLE line. If the first passive logic circuit LC does not indicate PASSED, then this 0 is passed on through the OR gate OR-6 to the next cursor circuit in the chain, and so on until the first cursor circuit is reached which has a PASSED signal from its respective passive logic circuit LC: at this circuit in the chain, the AND gate AND-20 will now produce a 1 output, showing that this passive logic circuit LC has the cursor. Subsequent cursor circuits in the chain are prevented from giving a similar indication because the OR gate OR-6 of the circuit with the cursor gives a 1 output at this time. The cursor output is used so that data from the record associated with the respective passive logic circuit LC can be read out, as will be described below. Once the data from this record has been read out, the PASS latch of that passive logic circuit is reset and its FAILED latch is set, and that cursor circuit passes a 0 to the adjacent circuit in the chain, so that the next passive logic circuit with a PASSED indication can be given the cursor for its associated data to be read out in similar fashion.

Figure 5:
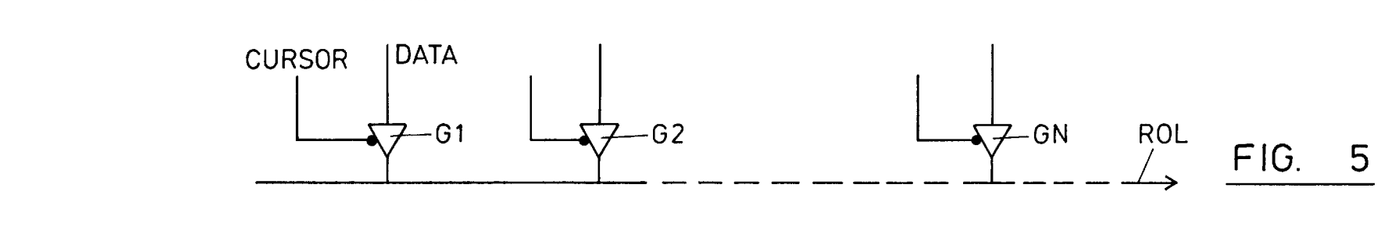
FIG. 5 is a block diagram of a read-out circuit of the system.

FIG. 5 shows the read-out circuit. DATA lines from the respective memory locations are connected to a common read-out line ROL via respective gates C1, C2 . . . which are controlled by the cursor outputs from the respective cursor circuits of FIG. 4. So if cursor circuit C2 has the cursor, this will be applied to read-out gate G2 for data to be read-out from the memory location along the common read-out line ROL. When the cursor has subsequently moved on to a later circuit in the cursor chain, the corresponding gate in the chain of read-out gates G1, G2 . . . will be activated for the corresponding data to be read out.

Figure 6:
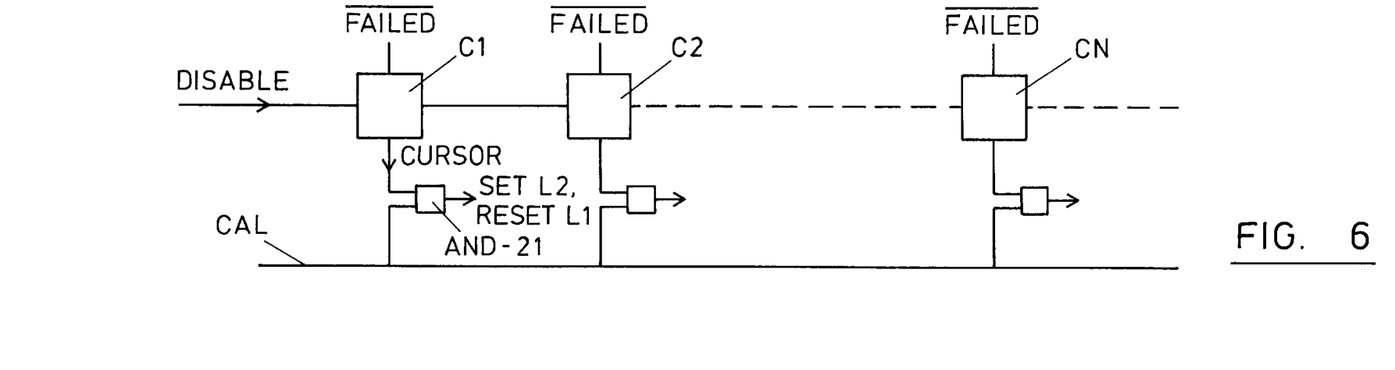
FIG. 6 is a block diagram of a circuit which may be included in the system for counting the number of records which have passed a comparison function.

Referring again to FIG. 4, the chain of cursor circuits will operate in the same manner as described above, if the FAILED output of the respective passive logic circuit LC is applied to each gate G1, G2 . . . instead of the corresponding PASSED output. This then enables an arrangement to be used for counting the number of records which have passed the comparison function carried out in the search, as a preferred alternative to including the tally circuit S of FIG. 1. Thus, referring to FIG. 6, a series of AND gates AND-21 may be provided, one for each passive logic circuit LC: a line CAL from the control element C is connected to one input of each gate AND-21, and the CURSOR output from the corresponding cursor circuit e.g. C1; the output of each gate AND-21 is connected to the SET input of the FAILED latch L2 in the respective passive logic circuit LC. Now when a pulse is applied to the line CAL from the control element C, at the cursor circuit which currently holds the cursor, the corresponding gate AND-21 will give an output to set its associated FAILED latch L2 and reset the corresponding PASS latch L1: this effectively removes the input signal (FAILED) from corresponding cursor circuit, so passing the cursor to the next cursor circuit in the chain which has a 1 (FAILED) on its input. By applying successive pulses on the line CAL, the cursor is passed along the chain of cursor circuits in steps, until it reaches the end: the number of pulses which must be applied to achieve this equals the number of cursor circuits having a 1 on their inputs (indicating NOT FAILED) and therefore the number of data records which have PASSED the comparison test.

The system preferably includes arrangements for writing or re-writing data into memory. The write procedure may be in the form read-modify-write, or maskable write: in either case data may be written to the records for all PASSED passive logic elements simultaneously, or to the record for the passive logic element holding the cursor, or to the records which have not PASSED.

It will be appreciated that the memory and passive logic elements may be integrated on a single semiconductor chip, which may additionally include any one or more of the following: the control circuit C, the PASS OR gate P of FIG. 1, the tally circuit TC, the cursor circuit, the read circuit and the write circuit.

I claim:

1. A data base searching system, comprising:

a) a memory having a plurality of locations for respective data items;

b) a plurality of logic test circuits to receive said respective data items in a serial manner over data lines connecting the memory to said test circuits;

c) an input which receives a query data item in said serial manner, said test circuits simultaneously and independently carrying out a comparative test between their respective data items and said query data item on a bit-by-bit basis and each test circuit providing an output indicating if its associated data item has passed said comparative test relative to the query data item; and d) a control unit which receives said query data item in said serial manner and also receives a selectable operating code defining the nature of the comparative test to be carried out by said test circuits, the control unit producing a plurality of query signals which are applied simultaneously to all said test circuits in parallel, wherein each said test circuit has means responsive to said query signals to carry out the selected comparative test between its respective data item and said query data item on a bit-by-bit basis, and having "passed", "failed" and "unknown" conditions and being arranged to change from the "unknown" condition to the "passed" condition when said test is passed and to change from the "unknown" condition to the "failed" condition when said test is failed, but being unable to change directly between the "passed" and "failed" conditions.

2. A data base searching system as claimed in claim 1, wherein:

each said test circuit has an additional input to receive additional control signals for changing the test circuit to its "unknown" condition if it has failed a first comparative test, or for changing the test circuit to its "unknown" condition if it has passed a first comparative test, before a second comparative test is carried out.

3. A logic test circuit for use in a data base searching system, said test circuit comprising:

a) an input for receiving a data item in a serial manner;

b) inputs for receiving a plurality of query signals representing a test which said circuit is to carry out; and c) means responsive to said query signal to carry out said test on said data item on a bit-by-bit basis, said circuit having "passed", "failed" and "unknown" conditions and being arranged to change from the "unknown" condition to the "passed" condition when said test is passed and to change from the "unknown" condition to the "failed" condition when said test is failed, but being unable to change directly between the "passed" and "failed" conditions.

4. A logic circuit for carrying out a logic function in a data base searching system, the logic circuit comprising:

a) a plurality of data inputs for simultaneously receiving respective items of data in a serial manner;

b) a plurality of mask inputs, one associated with each said data input;

c) masking means responsive to a signal received on any said mask input to mask the data item on the corresponding data input; and d) a first sub-circuit responsive to the unmasked data items to provide a first predetermined output signal, in respect of each individual bit position, when the bits of all unmasked data items have a first value at that bit position, and a second sub-circuit responsive to the unmasked data items to provide a second predetermined output signal, in respect of each individual bit position, when the bits of all unmasked data items have a second value at that bit position.

5. A logic circuit as claimed in claim 4, wherein:

each of said first and second sub-circuits comprises an AND gate.

6. A logic circuit as claimed in claim 4, wherein:

said masking means comprises a first plurality of OR gates each receiving a respective data item and connected to the corresponding mask input, and a second plurality of OR gates each receiving a respective data item in inverse form and connected to the corresponding mask input.

7. A logic circuit as claimed in claim 4, further comprising:

an OR gate to which said first and second predetermined output signals are applied, and providing a third output from said logic circuit in the absence of either said first or second predetermined signals.

8. A logic circuit as claimed in claim 4, further comprising:

an AND gate to which said first and second predetermined output signals are applied, and providing a fourth output from the logic circuit.

9. A data base searching system, comprising:

a) a memory having a plurality of locations for respective data items;

b) a plurality of logic test circuits to receive respective data items in a serial manner over data lines connecting the memory to said test circuits;

c) an input which receives a query data item in said serial manner, said test circuits simultaneously and independently carrying out a comparative test between their respective data items and said query data item on a bit-by-bit basis and each test circuit providing an output if its respective data item fails said comparative test; and d) a logic circuit which comprises a plurality of data inputs for simultaneously receiving said respective data items in said serial manner, a plurality of mask inputs, one associated with each said data input and connected to said output of the corresponding test circuit, masking means, responsive to a signal received on any said mask input to mask the respective data item on the corresponding data input, a first sub circuit responsive to the unmasked data items to provide a first predetermined output signal, in respect of each individual bit position, when the bits of all unmasked data items have a first value at that bit position, and a second sub-circuit responsive to the unmasked data items to provide a second predetermined output signal, in respect of each individual bit position, when the bits of all unmasked data items have a second value at that bit position.

10. A data base searching system as claimed in claim 9, wherein:

each of said first and second sub-circuits comprises an AND gate.

11. A data base searching system as claimed in claim 9, wherein:

said masking means comprises a first plurality of OR gates each receiving a respective data item and connected to the corresponding mask input, and a second plurality of OR gates each receiving a respective data item in inverse form and connected to the corresponding mask input.

12. A data base searching system as claimed in claim 9, further comprising:

an AND gate to which said first and second predetermined output signals are applied, and a fourth output provided from the logic circuit.

13. A data base searching system as claimed in claim 9, further comprising:

a control unit which receives said query data item in said serial manner a selectable operating code defining the nature of the comparative test to be carried out by said test circuits, the control unit producing a plurality of query signals which are applied simultaneously to all said test circuits in parallel, and each said test circuit being responsive to said query signals to carry out the selected comparative test between its respective data item and said query data item on a bit-by-bit basis.

14. A data base searching system as claimed in claim 9, further comprising:

a chain of cursor circuits 1,2,3, . . . , one said cursor circuit for each said test circuit, said chain of cursor circuits being arranged to identify the first test circuit in a chain which indicates that its associated data item has passed said comparative test, and to provide a cursor output on the respective cursor circuit, the chain of cursor circuits being further arranged to then pass the cursor output to the cursor circuit of the next test circuit in the chain which indicates that its associated data item has passed said comparative test.

15. A data base searching system as claimed in claim 9, further comprising:

a read-out circuit enabling any said data items, which have passed said comparative test, to be read-out one-at-a-time onto a common read-out line.

16. A data base searching system as claimed in claim 9, wherein:

said test circuits comprise additional inputs to receive additional control signals for changing to an "unknown" condition the test circuits which have failed a first comparative test, or for changing to the "unknown" condition the circuits which have passed a first comparative test, before a second comparative test is carried out.

17. A data base searching system as claimed in claim 9, wherein:

each test circuit provides a second output if its respective unmasked data item passes said comparative test.

18. A data base searching system as claimed in claim 17, further comprising:

a tally circuit to which said second outputs of said test circuits are connected, the tally circuit being arranged to count the "passed" outputs or to sum the corresponding data items.

19. A data base searching system as claimed in claim 9, further comprising:

an OR gate to which said first and second predetermined output signals are applied, and a third output provided from said logic circuit.

20. A data base searching system as claimed in claim 19, further comprising:

a control unit which receives said query data item in said serial manner a selectable operating code defining the nature of the comparative test to be carried out by said test circuits, the control unit producing a plurality of query signals which are applied simultaneously to all said test circuits in parallel, and each said test circuit being responsive to said query signals to carry out the selected comparative test between its respective data item and said query data item on a bit-by-bit basis.

21. A data base searching system as claimed in claim 20, wherein:

for the purpose of carrying out a minimum or maximum search through said items of data, means are provided for including said third output in said operating code, such that, when said third output is present, the control unit sets predetermined said query signals to predetermined values whereby, in a minimum search, those data items which have a value "1" at the bit position being examined cause their respective test circuits to be set to provide a FAILED output, and, in a maximum search, those data items which have a value "O" at the bit position being examined cause their respective test circuits to be set to provide a said FAILED output.

22. A data base searching system, comprising:

a) a memory having a plurality of locations for respective items of data;

b) a plurality of logic test circuits to receive respective said data items in a serial manner over data lines connecting the memory to said test circuits;

c) an input which receives a query data item in said serial manner, said test circuits simultaneously and independently carrying out a comparative test between their respective data items and said query data item on a bit-by-bit basis and each test circuit providing an output indicating if its associated data item has passed said comparative test relative to the query data item;

d) a control unit which receives said query data item in said serial manner and also receives a selectable operating code defining the comparative test to be carried out by said test circuits, the control unit producing a plurality of query signals which are applied simultaneously to circuits in parallel, each said test circuit having means responsive to said query signals to carry out the selected comparative test between its respective data item and said query data item on a bit-by-bit basis; and e) a tally circuit to which respective outputs of said test circuits are connected, each of which outputs indicates that the associated data item has passed said comparative test, the tally circuit being arranged to count the "passed" outputs or to sum the corresponding data items.

* * * * *